(12) United States Patent
Hickey et al.

(10) Patent No.: US 9,307,050 B2
(45) Date of Patent: Apr. 5, 2016

(54) CONFIGURABLE NETWORK DEVICE USER INTERFACE

(75) Inventors: James P. Hickey, Davis, CA (US);
Craig A. Vanzante, Roseville, CA (US);
Joseph A. Curcio, Jr., Folsom, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 2378 days.

(21) Appl. No.: 11/714,937

(22) Filed: Mar. 7, 2007

(65) Prior Publication Data

US 2008/0222285 A1    Sep. 11, 2008

(51) Int. Cl.
*H04L 29/08* (2006.01)
*H04L 12/24* (2006.01)

(52) U.S. Cl.
CPC ............ *H04L 67/36* (2013.01); *H04L 41/0893* (2013.01); *H04L 41/22* (2013.01); *H04L 67/02* (2013.01)

(58) Field of Classification Search
CPC ...................................................... H04L 67/36
USPC ........................................ 709/229, 224, 220
See application file for complete search history.

(56) References Cited

U.S. PATENT DOCUMENTS

| | | | |
|---|---|---|---|
| 5,548,722 A * | 8/1996 | Jalalian et al. ................. 709/220 |
| 5,726,883 A * | 3/1998 | Levine et al. .................... 700/83 |
| 5,796,951 A * | 8/1998 | Hamner et al. ................ 709/223 |
| 6,133,919 A | 10/2000 | Bormann et al. |
| 6,144,971 A * | 11/2000 | Sunderman et al. ........... 715/205 |
| 6,567,852 B2 | 5/2003 | Besaw et al. |
| 6,654,803 B1 * | 11/2003 | Rochford et al. .............. 709/224 |
| 6,801,949 B1 * | 10/2004 | Bruck et al. ................... 709/232 |
| 7,093,019 B1 | 8/2006 | Bertani et al. |
| 7,315,985 B1 * | 1/2008 | Gauvin et al. ................. 715/734 |
| 7,451,135 B2 * | 11/2008 | Goldman et al. |
| 7,853,880 B2 * | 12/2010 | Porter ........................... 715/734 |
| 7,966,388 B1 * | 6/2011 | Pugaczewski et al. ........ 709/223 |
| 2002/0069105 A1 * | 6/2002 | do Rosario Botelho et al. ............................... 705/14 |
| 2002/0196273 A1 * | 12/2002 | Krause ........................... 345/738 |
| 2003/0028826 A1 * | 2/2003 | Balluff ............................ 714/44 |
| 2003/0050976 A1 * | 3/2003 | Block ..................... G06Q 10/10 709/203 |
| 2004/0205271 A1 * | 10/2004 | O'Hare et al. ................. 710/240 |
| 2005/0138179 A1 * | 6/2005 | Encarnacion et al. ........ 709/227 |
| 2005/0149949 A1 * | 7/2005 | Tipton et al. .................. 719/321 |
| 2006/0174342 A1 * | 8/2006 | Zaheer et al. .................... 726/23 |
| 2006/0277460 A1 * | 12/2006 | Forstall et al. ................ 715/513 |
| 2007/0016557 A1 * | 1/2007 | Moore et al. ...................... 707/3 |
| 2007/0028174 A1 * | 2/2007 | Moore et al. .................. 715/733 |
| 2007/0150483 A1 * | 6/2007 | Goldman et al. .............. 707/10 |
| 2007/0198317 A1 * | 8/2007 | Harthcryde et al. ............. 705/8 |
| 2007/0236725 A1 * | 10/2007 | Harmon et al. .............. 358/1.15 |
| 2007/0250794 A1 * | 10/2007 | Miura et al. ................... 715/810 |
| 2008/0034070 A1 * | 2/2008 | Tan et al. ....................... 709/220 |
| 2008/0052754 A1 * | 2/2008 | Iga ..................................... 726/1 |
| 2010/0034108 A1 * | 2/2010 | Ode ............................... 370/252 |

* cited by examiner

*Primary Examiner* — O. C. Vostal

(74) *Attorney, Agent, or Firm* — Brooks, Cameron & Huebsch, PLLC

(57) ABSTRACT

Network devices, systems and methods are described that configure a network device user interface. One method includes receiving input to define user-selectable information from among a list of pre-arranged network information presented on a network device display. The method includes configuring the user-selectable information into a particular grouping and presenting the user-selectable information according to the particular grouping.

19 Claims, 6 Drawing Sheets

CONFIGURABLE NETWORK DEVICE USER INTERFACE

BACKGROUND

Computing networks can include multiple network devices such as routers, switches, hubs, servers, desktop PCs, laptops, and workstations, and peripheral devices, e.g., printers, facsimile devices, and scanners, networked together across a local area network (LAN) and/or a wide area network (WAN).

Monitoring, configuring, and troubleshooting the various network devices can become a daily task as network devices are added and the size of the network increases.

In previous approaches various aspects of a network and/or a network device would be monitored using whatever pre-arranged lists of network information were included within a given drop down menu to a user interface of a given network device. Various network tasks cause a user to access the user interface of a particular network device or network devices and to attempt to navigate between such pre-arranged lists of network information spread among multiple drop down menus and associated with numerous tabs. For example, a user may have access to a user interface and then have to navigate between the multiple pre-arranged lists of network information spread among multiple drop down menus and associated with numerous tabs to perform tasks such as adding a network device to the network, troubleshooting for an error and/or failure occurrence, troubleshooting less than optimal performance, and/or re-configuring a network device, etc.

With numerous tabs, e.g., forty (40) or more, presentable to a user interface, many different tabs would potentially have to be accessed to locate network information within various pre-arranged lists when performing just one particular task. In order to perform a second, e.g., different task, the user would once again have to navigate through many different tabs to locate other network information within among various pre-arranged lists as related to the second task. As network size increases, so too does the complexity of locating network information within the pre-arranged lists spread among multiple drop down menus and associated with numerous tabs.

DETAILED DESCRIPTION

Embodiments of the invention may include network devices and methods, including executable instructions, for a configurable network device user interface. Embodiments can present a list of user-selectable information from among a pre-arranged list of network information and can configure the user-selectable information into a particular grouping. One embodiment includes a network device having a processor in communication with a memory. The device includes a configurable user interface having a display. Computer executable instructions are storable in the memory and executable by the processor to receive input to define user-selectable information from among a pre-arranged list of network information presented on the display, configure the user-selectable information into a particular grouping, and present the user-selectable information according to the particular grouping.

As used herein, a "network" refers to a communication system that links two or more computers and peripheral devices and allows users to access resources on other computers and exchange messages with other users. A network may allow users to share resources on their own systems with other network users and to access information on centrally located systems and/or systems that are located at remote offices. A network may provide connections to the Internet and/or to the networks of other organizations. The network typically includes a cable that attaches to network interface cards ("NICs") in each of the devices within the network. Users may interact with network-enabled software applications to make a network request, such as to get a file or print on a network printer. The application may also communicate with the network software, which may then interact with the network hardware to transmit information to other devices attached to the network.

In addition, a local area network ("LAN") is a network that is located in a particular physical area, such as a building, in which computers and other network devices are linked, usually via a wiring-based cabling scheme. A LAN typically includes a shared medium to which workstations attach and through which they communicate. Local area networks often use broadcasting methods for data communication, whereby a device on the LAN can transmit a message that other devices on the LAN then "listen" to. However, the device or devices to which the message is addressed actually receives the message that is transmitted. Data is typically packaged into frames for transmission on the LAN. In some situations, the LAN media is an Ethernet, which can have, for example, a bandwidth of ten (10) megabits per second (Mbps). Embodiments, however, are not limited to these examples. Embodiments, however, are not limited to Ethernet network implementations.

Figure 1:
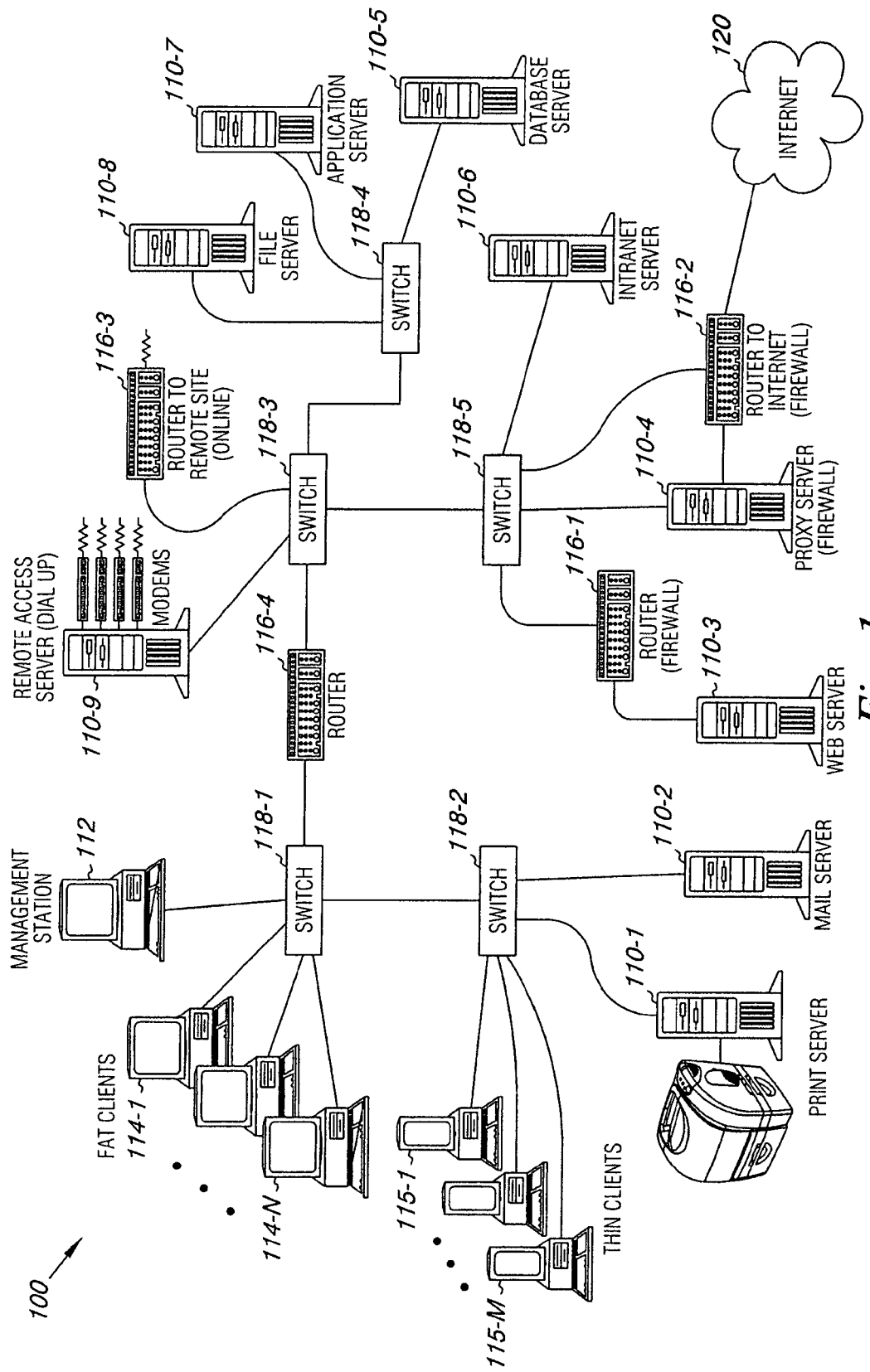
FIG. 1 illustrates an example of a computing device network.

FIG. 1 illustrates an example of a computing device network 100 in which at least one configurable network device user interfaces is implemented as described below. As shown in FIG. 1, a number of devices, e.g., PCs, servers, peripherals, etc., can be networked together via a LAN and/or WAN via routers, hubs, switches, and the like. As used herein a "network device" means a switch, router, hub, bridge, etc., i.e., a device having processor and memory resources and connected to a network 100, as the same will be understood by one of ordinary skill in the art. Although a switch will often be used in this disclosure as an exemplary network device, those skilled in the art will realize that embodiments of the invention may be implemented with other network devices. As the reader will appreciate, the term network device can also be used to refer to servers, PCs, etc., as illustrated further below.

The embodiment of FIG. 1 illustrates clients and servers in a LAN. The example network of FIG. 1 illustrates a print server 110-1 to handle print jobs for the network 100, a mail server 110-2, a web server 110-3, a proxy server (firewall) 110-4, a database server 110-5, an intranet server 110-6, an application server 110-7, a file server 110-8, and a remote access server (dial up) 110-9. The examples described here do not provide an exhaustive list of servers that may be used in a network.

The embodiment of FIG. 1 further illustrates a network management station 112, e.g., server, PC, and/or workstation, a number of "fat" clients 114-1, . . . , 114-N which can also include PCs and workstations and/or laptops, and a number of "thin" clients 115-1, . . . , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1 illustrates that these examples network devices can be connected to one another and/or to other networks via routers, 116-1, 116-2, 116-3, 116-4, hubs, and/or switches 118-1, 118-2, 118-3, 118-4, 118-5. As noted above, such network devices can include a processor in communication with a memory and will include network chips having hardware logic, e.g., in the form of application specific integrated circuits (ASICs), associated with a number of network ports. The term "network" as used herein is not limited to the number and/or type of network devices in FIG. 1's illustration. And, embodiments of the various devices in the network are not limited to a number, type, or size of processor or memory resources and/or logic.

Program instructions (e.g., computer executable instructions), as described in more detail herein, can reside on the various network devices. For example, program instructions in the form of firmware and/or software can be resident on the network 100 in the memory of a network management station 112 and/or one or more routers, 116-1, 116-2, 116-3, 116-4, hubs, and/or switches 118-1, 118-2, 118-3, 118-4, 118-5, and can be executable by the processor(s) and/or logic (e.g., hardware in the form of transistor gates) thereon. Also, program instructions can be resident in a number of locations on various network devices in the network 100 as can be employed in a distributed computing network.

A "distributed computing network" refers to the use of multiple computing devices, e.g., having processor and memory resources, in a network to execute various roles in executing instructions, e.g., application processing, etc., as described herein. "Software" as used herein, includes a series of executable instructions that can be stored in memory and executed by the hardware logic of a processor (e.g., transistor gates) to perform a particular task. Memory, as the reader will appreciate, can include random access memory (RAM), read only memory (ROM), non-volatile memory (e.g., Flash memory), etc.

As one of ordinary skill in the art will appreciate, each network device in the network 100 can be physically associated with a port of a switch to which it is connected. Data packets pass through the network. Users physically connect to the network through these ports. Data frames, or packets, can be transferred between network devices by means of a switch's logic link control (LLC)/media access control (MAC) circuitry, or "engines", associated with ports on a network device, e.g., switch. A network switch forwards data frames received from a transmitting network device to a destination network device based on the header information in received data packets. The switch can also forward packets from a given network to other networks through ports on one or more other switches.

Figure 2:
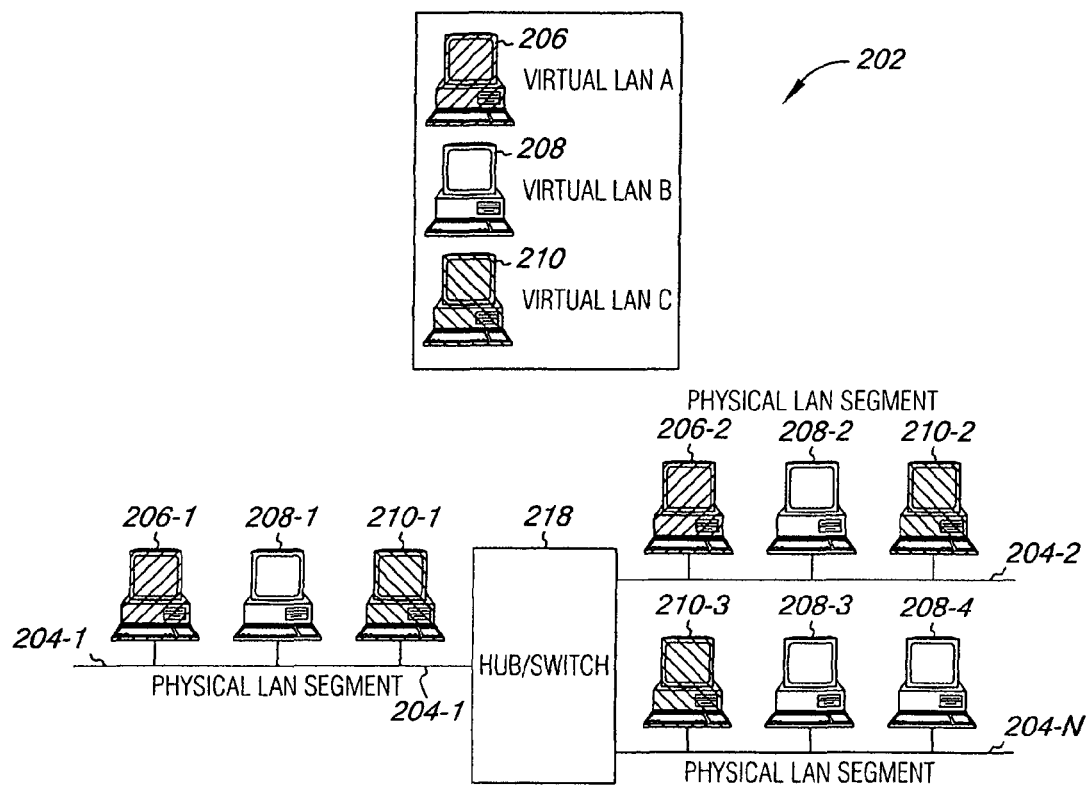
FIG. 2 illustrates a local area network (LAN) switch.

FIG. 2 illustrates a local area network (LAN) switch in which at least one embodiment of the invention is implemented. The embodiment of FIG. 2 illustrates a portion of a network 202, such as network 100 in FIG. 1, including virtual local area network (VLAN) logical subgroups e.g., virtual LAN A 206, virtual LAN B 208, virtual LAN C 210, relative to various physical LAN segments, e.g., 204-1, 204-2, . . . , 204-N, to which multiple network devices, e.g., 206-1, 206-2, 208-1, 208-2, 208-3, 208-4, 210-1, 210-2, 210-3, can be attached.

In the VLAN mode of operation, the switches, e.g., 218, transport frames or packets back and forth between network devices, e.g., 206-1, 206-2, 208-1, 208-2, 208-3, 208-4, 210-1, 210-2, 210-3, designated as members of a particular VLAN, e.g., virtual LAN A 206, virtual LAN B 208, virtual LAN C 210.

In the context of the present disclosure, the term "switching" refers to a technology in which a network device (e.g., a switch 218) connects two or more LAN or VLAN segments. A switch 218 can transmit frames of data from one segment to their destinations on the same or other segments. When a switch 218 begins to operate, it examines the MAC address of the frames that flow through it to build a table of known sources. If the switch 218 determines that the destination of a frame is on the same segment as the source of the frame, it drops, or filters, the frame because there is no need to transmit it. If the switch 218 determines that the destination is on another segment, it can transmit the frame onto the destination segment. Finally, using a technique known as flooding, if the destination segment is unknown, the switch 218 can transmit the frame on all segments except the source segment.

Like bridges and other network devices, switches 218 are designed to divide a large, unwieldy local network into smaller segments, insulating each segment from local traffic on other segments, thus increasing aggregate bandwidth while still retaining full connectivity. Switches 218 can also include many ports, allowing several independent data paths through the device. The more ports a switch 218 includes can increase the data throughput capabilities of the switch 218.

However, as mentioned in the background, monitoring, configuring, and troubleshooting the various network devices, VLANs, etc., can become a daily task as network devices are added and the size of the network increases.

Figure 3:
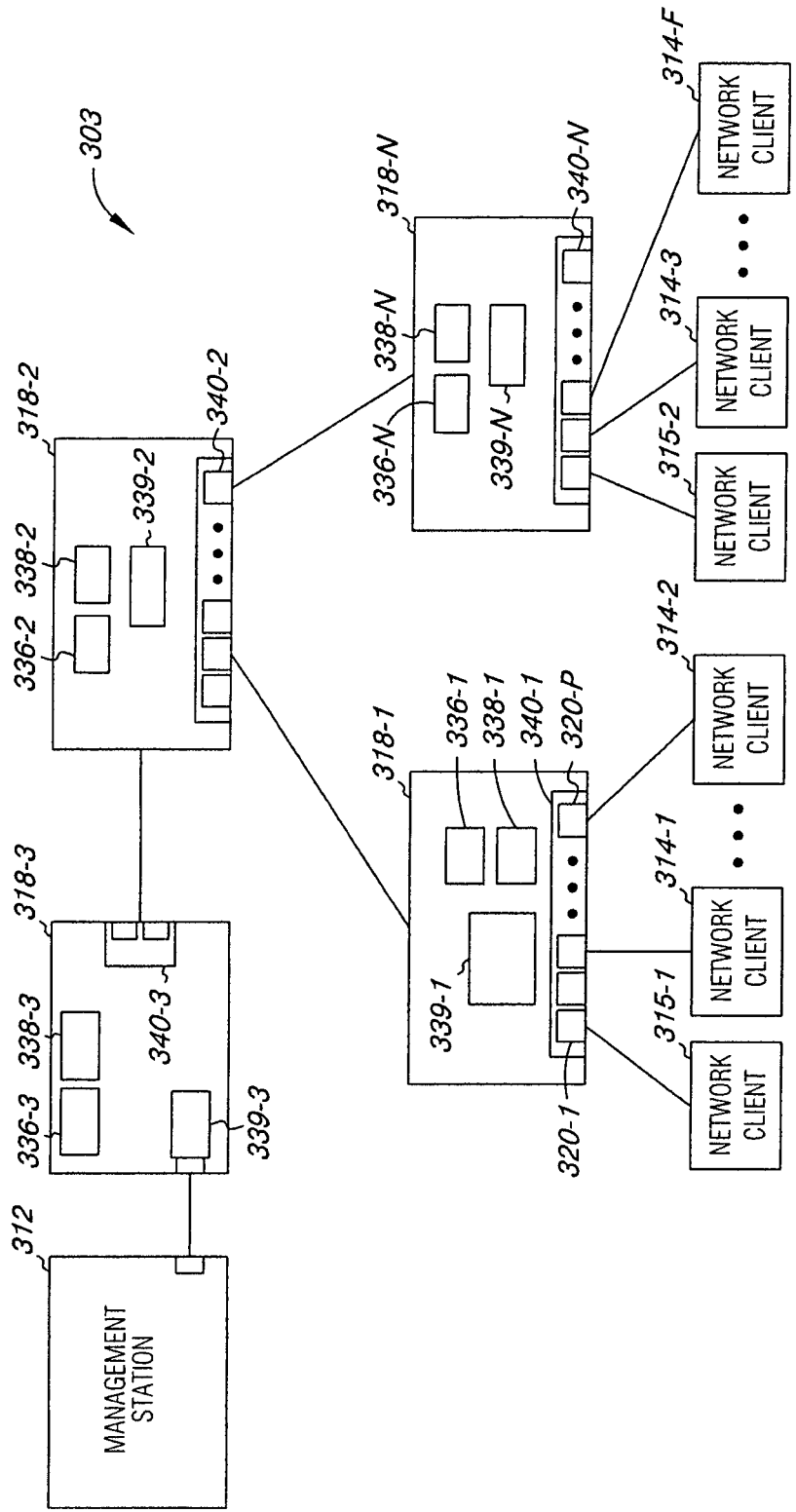
FIG. 3 illustrates a portion of a network including network devices.

For example, FIG. 3 illustrates an embodiment of a portion of a network 303, e.g., network 100 shown in FIG. 1, including embodiments of various network devices, e.g., switches, 318-1, 318-2, . . . , 318-N, which can implement various embodiments of the invention. In some embodiments, various network devices e.g., 318-1 and 318-N can have ports connected directly to network clients, e.g., 315-1, 315-2, . . . , 314-1, . . . , 314-F. The network clients can include "fat" and "thin" clients as discussed herein in connection with FIG. 1. Additionally, "fat" and "thin" clients, 315-1, 315-2, . . . , 314-1, . . . , 314-F, can be members of particular VLANs, as described herein in connection with FIG. 2.

As described in connection with FIG. 1, the various network devices, 318-1, 318-2, . . . 318-N, can include switches, routers, hubs, etc. (shown as switches in FIG. 3). Such network devices, 318-1, 318-2, . . . 318-N, can include processor, e.g., 336-1, . . . , 336-N, and memory, e.g., 338-1, . . . , 338-N, resources. The network devices, 318-1, 318-2, . . . 318-N, can similarly include a number of network chips, e.g., 340-1, . . . , 340-N, including logic circuitry (hardware) and each network chip, 340-1, . . . , 340-N, can include a number of network ports, 320-1, 320-2, . . . , 320-P to send and receive data packets (network traffic) throughout the network 300.

The logic circuitry of the number of network chips, e.g., 340-1, . . . , 340-N, can include ASICs which serve as a media access controllers (MACs).

According to embodiments, various network devices, e.g., 318-1, 318-2, . . . 318-N, in a network, e.g., network 100 in FIG. 1, can be regularly maintained and/or configured when, for example, a new network device is added to the network. In some embodiments, various network devices, e.g., 318-1, 318-2, . . . 318-N shown in FIG. 3, can include or be associated with a user interface 339-1, . . . , 339-N, such as a command line interface (CLI) or a graphical user interface (GUI). According to embodiments, the user interface 339-1, . . . , 339-N can be used for interacting with a particular network device and/or network device software. In embodiments where the user interface 339-1, . . . , 339-N is a CLI, the user interface 339-1, . . . , 339-N can be used for interacting with the network device and/or network device software using text line commands. Commands can be entered from an input device such as a keyboard, and can be viewed as text on the user interface 339-1, . . . , 339-N in the form of a display. In embodiments where a user interface 339-1, . . . , 339-N is a GUI, the user interface 339-1, . . . , 339-N can be used for interacting with a particular network device and/or network device software through the manipulation of graphical elements that represent the information and actions available to a user. In addition, in some embodiments, the user interface 339-1, . . . , 339-N can be accessible via the web. One skilled in the art will know that the term "web" refers to both the Internet and, more particularly, to the World Wide Web or "WWW", a subset of the Internet.

The method embodiments described next in connection with FIGS. 4 and 5 can be performed by software (as the same has been described herein), hardware in the form of logic, and/or application modules (i.e., a self-contained hardware or software component that interacts with a larger system) on the systems and devices shown herein or otherwise. As the reader will appreciate, a software module may come in the form of a file and handle a specific task within a larger software system. A hardware module may be a separate set of logic, e.g., transistor/circuitry gates, that "plug-in" as a card or otherwise, to a larger system and/or device. Embodiments, described herein, are not limited to a particular operating environment and/or to software or executable instructions composed in a particular language or syntax.

Unless explicitly stated, method embodiments described herein are not constrained to a particular order or sequence. Additionally, some of the described method embodiments can occur or be performed at the same point in time.

Figure 4:
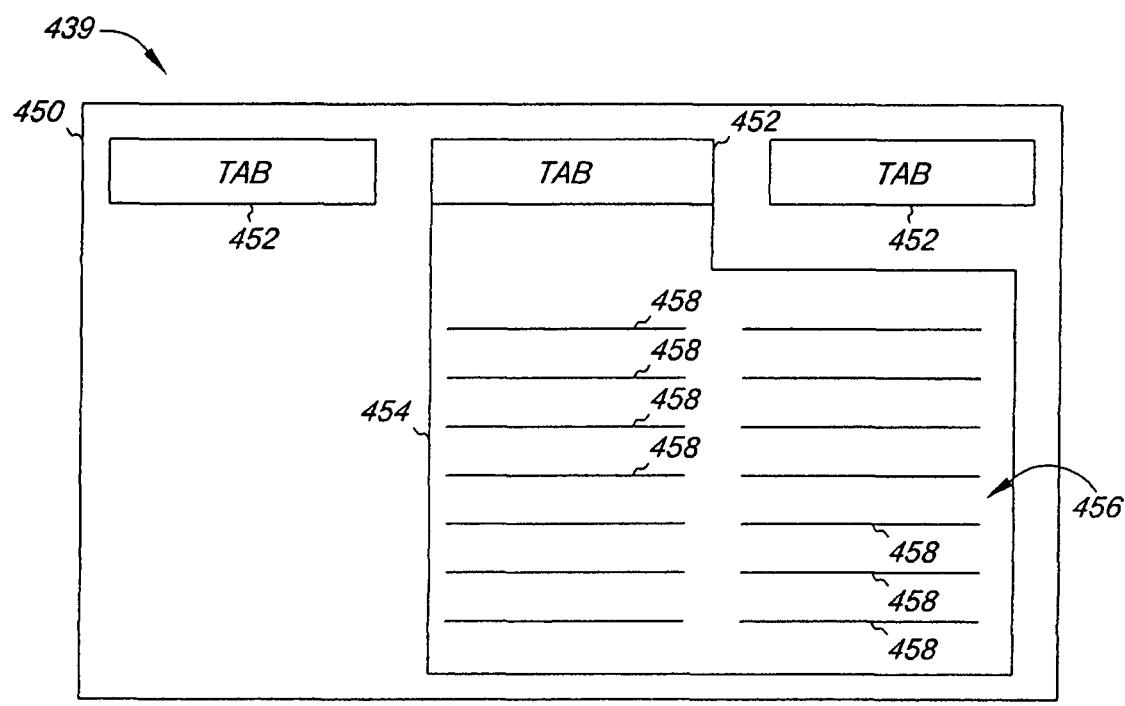
FIG. 4 illustrates a display as part of a user interface presenting user-selectable information.

FIG. 4 illustrates a display 450 as part of a user interface 439 according to an embodiment of the present invention. The user interface 439 can be associated with a single network device, e.g., such as a switch 118-1 in FIG. 1 or 318-1 in FIG. 3. In addition, the user interface 439 can be associated with a network management station, e.g., 112 in FIG. 1. Additionally, the display 450 of the user interface 439 can show network information relating to various network devices, e.g., 118-1, . . . , 118-N in FIG. 1 and 318-1, . . . , 318-N in FIG. 3, within a network.

In the embodiment illustrated in FIG. 4, the display 450 of the user interface 439 is shown having a number of tabs 452 that include drop down menus 454 when a tab 452 is selected. Although the display 450 is illustrated as having three (3) tabs 452, one skilled in the art will appreciate that a given display can include more or fewer number tabs 452, e.g. forty (40) or more. The drop down menu 454 can include a pre-arranged list of network information, shown collectively as 456 in drop down menu 454.

According to various embodiments of the invention, computer executable instructions are stored in memory and can be executed by a processor of a network device, e.g., 338-1 and 336-1 of device 318-1 in FIG. 3, such that various items of information 458 in the list of network information 456 is independently, user-selectable. According to embodiments, the item information 458 among the user-selectable item information can include, but is not limited to, virtual local area network (VLAN) configuration information, VLAN status information, LAN configuration information, LAN status information, wireless area network (WAN) status information, WAN configuration information, port configuration information, port status information, bandwidth information, security information, data traffic information, link status information, link speed information, etc. One can appreciate that the drop down menus 454 can include very large lists of network and network device information. For example, a single switch, e.g., 318-1 in FIG. 3, in a network can include up to two hundred eighty (280) ports, and the various drop down menus 454 presentable on the display 450 of the user interface can include lists 456 of network and/or network device information for at least each port as well as a myriad of other device and network information such as the examples given above.

Figure 5:
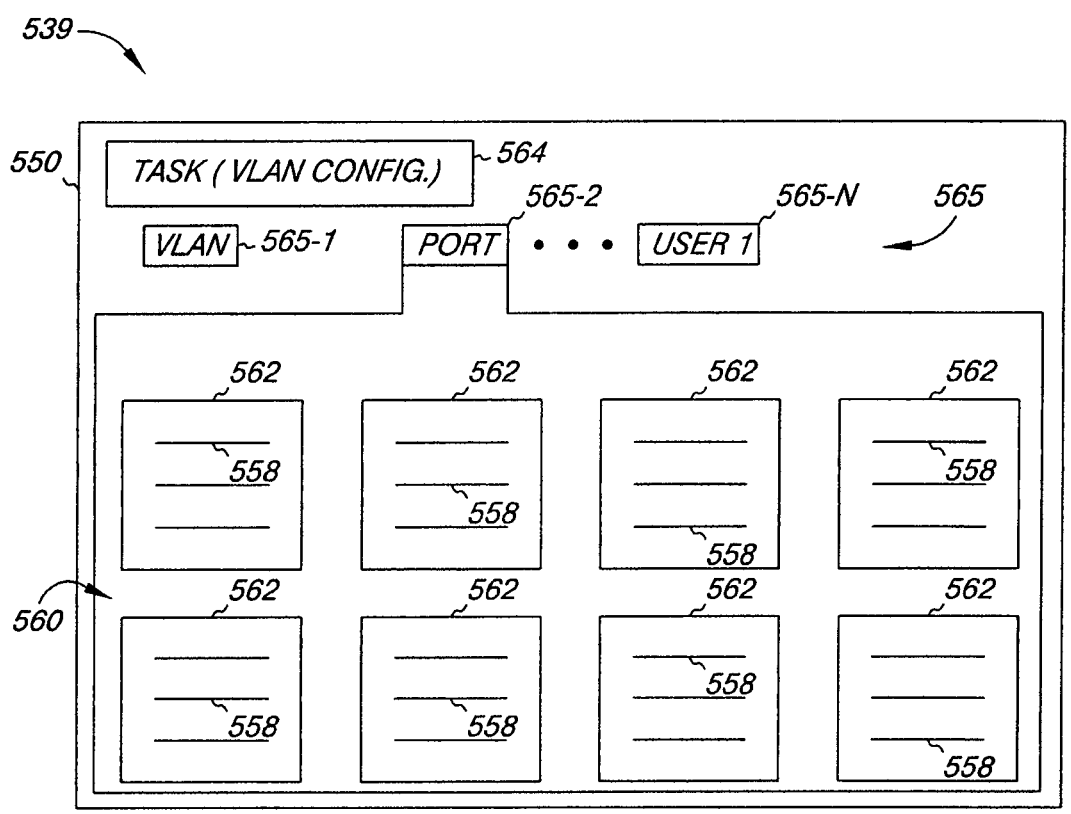
FIG. 5 illustrates a display as part of a user interface presenting particular groupings of user-selectable information.

According to embodiments described herein, and as illustrated further in connection with FIG. 5, computer executable instructions can be executed through user interaction with the user interface 439 to select various item information 458 within various lists 456 spread among multiple drop down menus 454 associated with numerous tabs 452 and to organize the various item information 458 into a particular grouping in association with one or more particular task.

That is, embodiments provide methods in the form of instructions executable on one or more network device to make item information 458 user-selectable and to store the user-selectable information 458 from among a pre-arranged list of network information 456 into a particular grouping in order to reduce the number of times a user has to navigate between lists 456 of item information 458 contained in the drop down menus 454 of the various tabs 452 in association with a particular task.

According to various embodiments, computer executable instructions storable in the memory and executable by the processor are executed to receive input to select item information effectively defining user-selectable information 458 from among a list of item information 456. For example, a user can designate, e.g., with a flag, click, highlight menu item, etc., a number of particular user-selectable information 458 from among the various lists of network information 456 contained in one or more drop down menus 454 from the one or more tabs 452.

Instructions can further be executed to configure the user-selectable information 458 into a particular grouping, and present the user-selectable information 458 according to the particular grouping which can be given a particular label or identifier as described next in connection with FIG. 5.

FIG. 5 illustrates a display 550 as part of a user interface 539 according to an embodiment of the present invention. The embodiment of FIG. 5 illustrates a particular grouping 560 shown on display 550 of the user interface 539. As shown in FIG. 5, in some embodiments the computer readable instructions can be executed to separate and order the user-selected item information 558 into a number of panels 562 as subsets to a particular grouping 560 associated with a particular task 564. As shown in the embodiment of FIG. 5, the number of panels 562 may be presented for simultaneous display on the user-interface 539 according to a particular user's preference.

And, the instructions associated with the user interface 539 can be executed to present the user-selectable information 558 according to the particular grouping 560, including panels 562, in reference to the associated task 564. That is, a particular label or user chosen identifier can be defined.

As the reader will appreciate, the computer executable instructions can save the user-selectable information 558 and the particular grouping 560 in association with the particular task label 564 (e.g., VLAN Config.) to memory of a given network device. As mentioned above, in some embodiments the user interface 539 can be accessed via the web. In such embodiments, the user-selectable information 558 that has been placed into particular groupings 560 can be saved in one or more cookies in a user web browser, as the same will be understood by one of ordinary skill in the art. As used herein, "cookies" mean small data files that can be stored in a web browser and/or a network device memory.

More than one particular grouping 560 can be saved in association with a particular task 564. Additionally, a given particular grouping may be associated with more than one particular task. And, one or more other particular groupings, e.g., a second set of user-selectable information 558 and particular groupings 560, can be saved in association with one or more different tasks, e.g., a second particular network task 564. Embodiments are not limited to these examples.

Thus, among various embodiments, computer executable instructions can receive input to define user-selectable information 558 from among a pre-arranged list of network information, configure the user-selectable information 558 into a number of panels 562 within a user-particular grouping 560, and save the particular grouping 560 in association with a particular task 564. A user can designate a number of particular user-selectable information 558 from among the network information contained in the one or more drop down menus from one or more tabs shown in FIG. 4 using a flag, highlight feature, etc. Once the user has defined user-selectable information 558 from among a pre-arranged list of network information, and ordered the user-selectable information into a number of panels 562 within particular groupings 560, a user can enter a command to save the particular grouping 560. The computer executable instructions will receive the command and cause the processor to save the particular groupings 560 in association with various designated tasks 564 in memory.

As described in more detail below, the computer executable instructions can order the particular groupings 560 in association with various tasks 564 according to user-particular groupings and/or particular vantage points relative to given task. That is, the particular groupings 560 in association with particular tasks 564 can be configurable and independently designated according to particular users. For example, for a particular task 564, e.g., VLAN configuration, a particular grouping 560 can be saved under a "user" and/or "vantage point" grouping identifier, 565-1, . . . , 565-N, in association with the given task 564, e.g., VLAN configuration. For example, in some embodiments, the user and/or vantage point grouping identifier, 565-1, . . . , 565-N, is associated with a particular user, e.g, USER 1 565-N. In this manner, various access rights, e.g., according to security, etc., can be granted to various particular groupings 560. The access rights may range from allowing a number of particular "log on" and "password" combinations access to certain particular groupings 560 associated with one or more particular task(s) 564 to allowing only one particular log on and password combination access to other particular groupings 560 associated with one or more particular task(s) 564. Hence, flexibility is afforded by allowing a number of particular log on and password combinations access to certain particular groupings 560 associated with one or more particular task(s) 564 as further defined as user-particular and/or vantage point particular, 565-1, . . . , 565-N, etc. Security is also afforded by allowing only one particular log on and password combination access to other particular groupings 560 associated with one or more particular task(s) 564 which may be further defined as user-particular and/or vantage point particular, 565-1, . . . , 565-N, etc.

As the reader will appreciate, a first user-particular grouping, e.g., 565-N, can include a first presentation arrangement for the panels 562 provided to the display 550 of the user interface 539, and a second user-particular grouping, i.e., a USER 2 (not shown), could include a second presentation arrangement for the panels 562 provided to the display 550 of the user interface 539 on a particular network device, e.g., switch 318-1 in FIG. 3. A first user-particular grouping, 565-N, can be associated with a first particular task, e.g., task 564 (VLAN CONFIG.) while a second user-particular grouping could be associated with a second, different, particular task. Each particular task and/or user-particular grouping can be saved according to a task, e.g., task identifier 564 and/or user-particular grouping identifier 565-N, to aid in locating a particular task and/or user particular grouping associated with a particular task.

Additionally, as shown in FIG. 5, a given particular grouping 560, and the panels 562 can show information relating to a given task, e.g., task 564 (VLAN CONFIG.) from different vantage points ("perspectives"), e.g., VLAN perspective 565-1, port perspective 565-2, etc. For example, if a first task is to configure a VLAN, e.g., task 564 (VLAN CONFIG.), then a first set of panels 562 in a certain user and/or vantage point particular grouping can display user-selectable information 558 related to the VLAN point of view, e.g., VLAN perspective 565-1, and can be saved according to this particular vantage point grouping identifier, e.g., 565-1, in association with the VLAN configuration task 564, e.g., task 564 (VLAN CONFIG.). However, a different user and/or vantage point particular grouping 560 can also include a second set of panels 562 saved under a second user and/or vantage point particular grouping identifier, displaying user-selectable information 558 according to a different point of view, for example, to display user and/or vantage point selectable information 558 related to one or more different perspectives, e.g., port perspective 565-2. Thus, both the first set of panels 562 and the second set of panels 562 can contain user-selectable information 558 related and useful to the task of configuring a VLAN, e.g., task 564 (VLAN CONFIG.), but presented from different vantage points, e.g., VLAN 565-1, port perspective 565-2, a certain user perspective 565-N, etc.

In some embodiments, the user and/or vantage point particular grouping identifiers, 565-1, . . . , 565-N, associated with a particular task 564 can be displayed with the particular task 564. In this way, a user can choose from among the user and/or vantage point particular grouping identifiers, 565-1, . . . , 565-N, where the user and/or vantage point particular grouping identifiers, 565-1, . . . , 565-N, include different device perspectives to the particular groupings 560 and sets of panels 562. As shown in the embodiment of FIG. 5, a user can preview display the different device perspectives to the particular groupings 560 and sets of panels 562 associated with a given user and/or vantage point particular grouping identifiers, 565-1, . . . , 565-N in the form of a drop down menu when a given user and/or vantage point particular grouping identifier, 565-1, . . . , 565-N, is highlighted or click selected, e.g., selected port vantage point 565-2. By ordering and displaying user-selectable information 558 among different panels 562 associated with different user and/or vantage point particular grouping identifiers, 565-1, . . . , 565-N, in association with the particular task 564, the ease of accessing user and/or task relevant information can be significantly enhanced.

Figure 6:
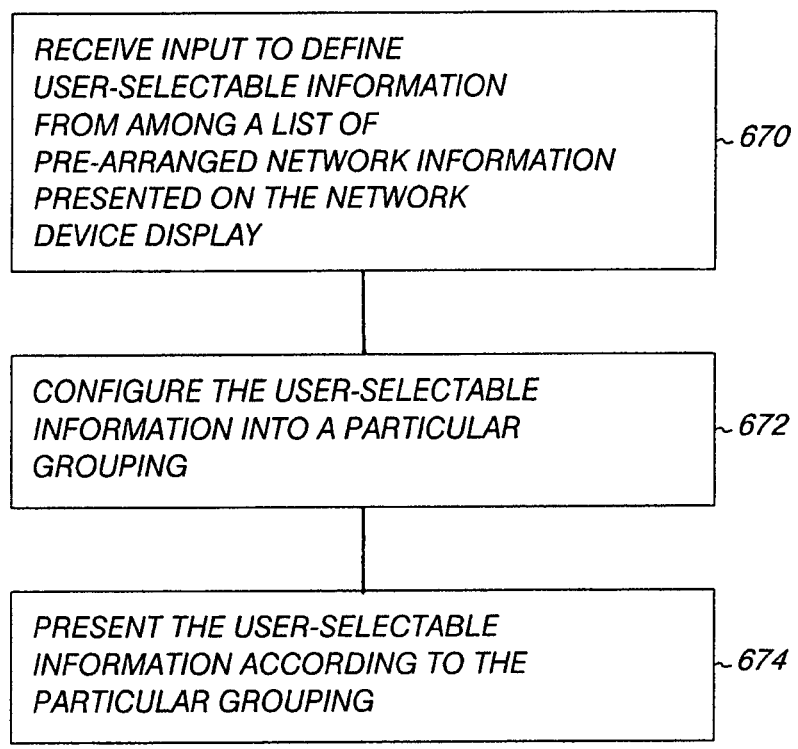
FIG. 6 illustrates a method embodiment for a configurable network device user interface.

FIG. 6 illustrates a method embodiment for a configurable network device user interface. As shown in FIG. 6 the method includes computer executable instructions storable in a memory and executable by a processor of a network device to receive input to define user-selectable information from among a list of pre-arranged network information presented on a display of the network device, as shown at block 670. As shown at block 672, the instructions can be executed to configure the user-selectable information into a particular grouping. And, as shown at block 674, the instructions can be executed to present the user-selectable information according to the particular grouping.

The computer executable instructions operable to perform the method described in connection with FIG. 6 can be present in whole or in part in embodiments of other Figures, e.g., in one embodiment of FIG. 1 the management station 112 includes instructions to execute the method described in connection with FIG. 6. Similarly, the network devices, e.g., switches 118-1, 118-2, . . . , 118-5, and/or routers 116-1, 116-2, . . . , 116-4, can include, in whole or in part the instructions to execute the method described in connection with FIG. 6. Additionally, hub/switch 218 in FIG. 2, and/or management station 312, and switches 318-1, . . . , 318-N of FIG. 3 can include, in whole or in part the instructions to execute the method described in connection with FIG. 6. Embodiments, however, are not limited to the example given herein.

It is to be understood that the above description has been made in an illustrative fashion, and not a restrictive one. Although particular embodiments have been illustrated and described herein, those of ordinary skill in the art will appreciate that other component and device logic arrangements can be substituted for the particular embodiments shown. The claims are intended to cover such adaptations or variations of various embodiments of the disclosure, except to the extent limited by the prior art.

In the foregoing Detailed Description, various features are grouped together in a single embodiment for the purpose of streamlining the disclosure. This method of disclosure is not to be interpreted as reflecting an intention that any claim of the invention requires more features than are expressly recited in the claims. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed:

1. A network device, comprising:
a processor;
a memory in communication with the processor;
a configurable user interface on the device having a display; and
computer executable instructions storable in the memory and executable by the processor to:
receive via the configurable user interface input to identify user-selected network information from among lists of pre-arranged network information initially presented on the display within multiple drop down menus;
organize the user-selected network information from the lists of pre-arranged network information into a particular grouping associated with a particular task;
separate and order the user-selected network information from the lists of pre-arranged network information into a number of panels as subsets to the particular grouping according to a particular user; and
simultaneously present the number of panels of the user-selected network information from the lists of pre-arranged network information on the display according to a presentation arrangement of the panels for the particular grouping according to the particular user.

2. The network device of claim 1, further including computer executable instructions storable in the memory and executable by the processor to save the user-selected network information and the particular grouping in the network device memory.

3. The network device of claim 1, wherein the user-selected network information and the particular grouping are saved in one or more cookies in a user web browser.

4. The network device of claim 1, wherein the display is a graphical user interface to present the user-selected network information according to the particular grouping.

5. The network device of claim 4, further comprising:
saving a first presentation arrangement of the number of panels associated with the particular task and a first particular user; and
saving a second different presentation arrangement of the number of panels corresponding to the particular task and a second particular user.

6. The network device of claim 5, further comprising:
saving a first presentation arrangement of the number of panels associated with the particular task, a first particular user, and a first vantage point; and
saving a second presentation arrangement of the number of panels associated with the particular task, the first particular user, and a second vantage point.

7. The network device of claim 4, wherein the graphical user interface is a web accessible graphical user interface.

8. The network device of claim 1, where the user-selected network information is selected from the group including: VLAN configuration information, VLAN status information, port configuration information, port status information, bandwidth information, data traffic information, link status information, and link speed information.

9. A non-transitory computer readable medium having executable instructions which can be executed by a processor to cause a network device to perform a method, comprising:
receiving input to identify user-selected network information from among lists of pre-arranged network information initially presented on a display within multiple drop down menus;
organizing the user-selected network information from the lists of pre-arranged network information into a number of user-particular groupings associated with a particular task;
configuring the user-selected network information from the lists of pre-arranged network information relevant to the particular task into a number of panels as subsets to the user-particular groupings associated with the particular task and according to a particular user;
saving, as a presentation arrangement, the configured number of panels for a user-particular grouping; and
simultaneously presenting to a display, in the saved presentation arrangement, the number of panels of the user-selected network information from the lists of pre-arranged network information of the user-particular grouping according to the particular user choosing the particular task.

10. The non-transitory computer readable medium of claim 9, wherein saving the configured number of panels for the user-particular grouping includes saving in cookies on a web browser.

11. The non-transitory computer readable medium of claim 9, wherein saving, as a presentation arrangement, the configured number of panels for a first user-particular grouping includes saving a first presentation arrangement of the number of panels according to the particular user choosing a first vantage point of the particular task and saving a second presentation arrangement of the number of panels according to the particular user choosing a second vantage point of the particular task.

12. The non-transitory computer readable medium of claim 11, wherein the number of panels of the first user-particular grouping are a different set of panels than the number of panels of the second user-particular grouping.

13. The non-transitory computer readable medium of claim 9, wherein the method further includes associating the user-particular groupings with one or more log-in and password combinations indicative of the particular user.

14. A method for providing information concerning a network switch, comprising:
receiving input to the network switch to identify user-selected network information from among pre-arranged lists of switch information initially arranged within multiple drop down menus;
organizing the user-selected network information from the lists of pre-arranged network information into a user-particular grouping associated with a particular task;
configuring the user-selected network information from the lists of pre-arranged network information among a number of panels as subsets to the user-particular grouping associated with a particular task and according to a perspective within the task; and
simultaneously displaying the number of panels of the user-selected network information from the lists of pre-arranged network information according to a saved presentation arrangement, the particular task, and the perspective within the task to a user interface.

15. The method of claim 14, wherein the method includes saving the user-selected network information included in the user-particular grouping in one or more cookies on a web browser.

16. The method of claim 14, wherein the method includes associating a first task and a first perspective within the first task for the user-particular grouping with a first log-on and password.

17. The method of claim 16, wherein the method includes associating the first task and the first perspective within the first task for the user-particular grouping with several log-on and password combinations.

18. The method of claim 17, wherein the method includes associating a second task and a second perspective within the second task for the user-particular grouping with only one log-on and password combination.

19. The method of claim 14, wherein configuring the user-selected network information among the number of panels includes separating and ordering the user-selected network information within the number of panels.

\* \* \* \* \*